April 13, 1965    G. LA FLEUR ETAL    3,177,915
TRIM FASTENER AND STRIP
Original Filed Sept. 5, 1958
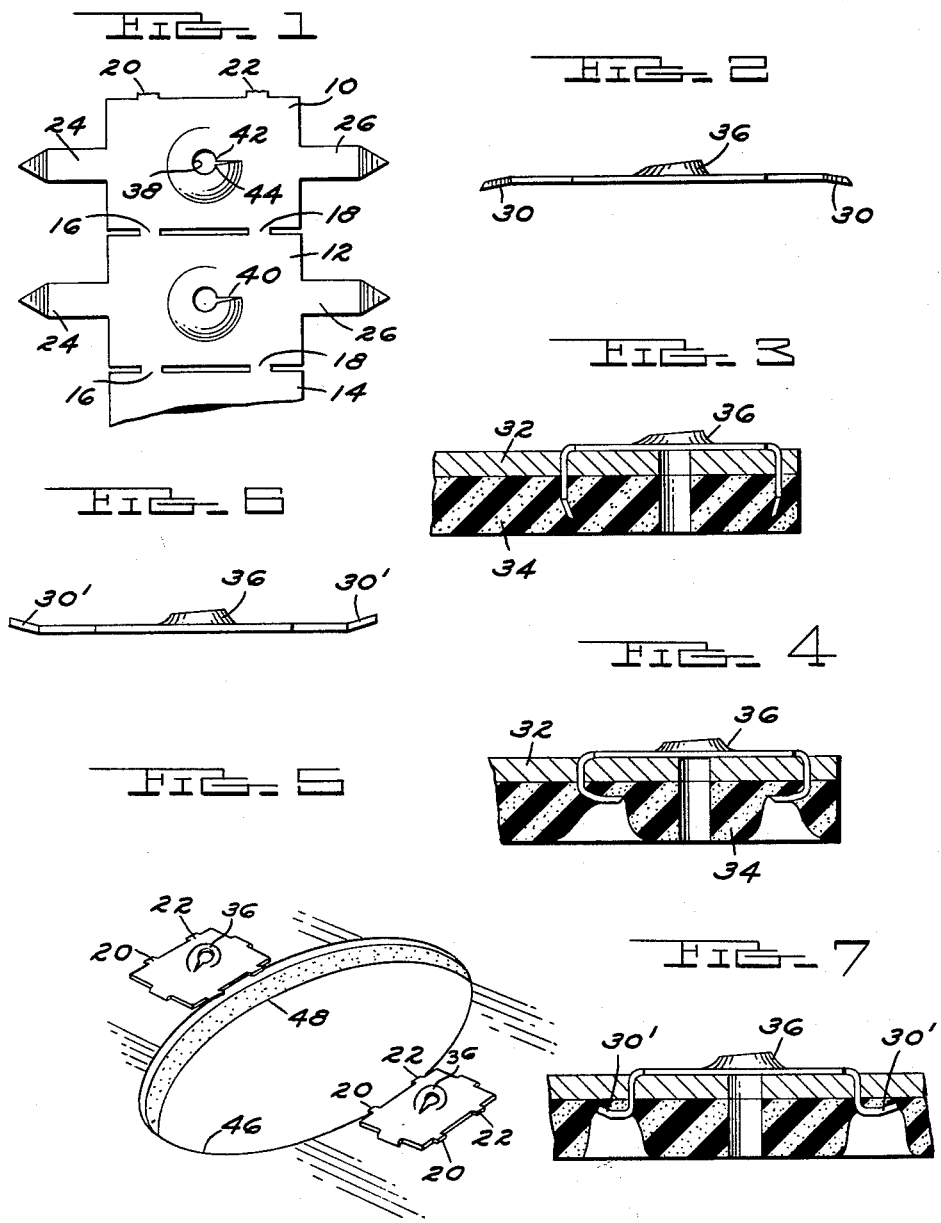
INVENTOR.
GEORGE LA FLEUR
BY WILLIAM H. GALLAGHER
Burton & Parker
ATTORNEYS United States Patent Office 3,177,915
Patented Apr. 13, 1965

3,177,915
TRIM FASTENER AND STRIP
George La Fleur, 1190 Mason, Dearborn 8, Mich., and William H. Gallagher, 19161 Oakfield, Detroit 35, Mich.
Continuation of application Ser. No. 759,209, Sept. 5, 1958. This application Jan. 16, 1961, Ser. No. 82,946
1 Claim. (Cl. 151—41.72)

This invention relates to a trim fastener strip and to the fasteners comprising the strip. This application is a continuation of our application for Trim Fastener and Strip, Serial No. 759,209, filed September 5, 1958, and now abandoned.

An object of the invention is the provision of a trim fastener strip for use with a cutoff forming and fastener applying machine to which the strip may be fed and which will successively sever successive fasteners from the strip and fasten the same in a panel or the like.

Another object of the invention is the provision of a trim fastener strip comprising successive fasteners integrally connected by pairs of severable tabs, the tabs being of such length that they may be severed midway of their length and the resulting ears may be allowed to remain on the detached fastener without interfering with subsequent application of the fastener. Heretofore trim fastener strips have had relatively long tabs connecting successive fasteners of the strip together and these tabs had to be severed at two points, one adjacent each fastener, and this required a cutoff machine having provision for removing and discarding the severed tabs. In carrying out this object we provide a succession of fasteners connected by pairs of severable tabs which are of a length substantially equal to the thickness of the material from which the fasteners are formed.

Another object of the invention is the provision of a trim fastener strip consisting of a succession of fasteners disposed in end-to-end relation and integrally connected by pairs of tabs, with fastener prongs extending from opposite sides of the strip and integrally connected to individual fasteners thereof, with the prongs being bendable from a position coplanar with the fasteners to a position extending substantially perpendicularly out of the plane of the fasteners.

Another object of the invention is the provision of a fastener of the above-mentioned character having a screw thread receiving helix pressed out of the plane of the fastener, with such helix comprising a cone-like protuberance having a screw-receiving aperture at the apex thereof and with the protuberance severed through from the aperture to the base of the protuberance with the severed edges being at that side of the fastener adjacent one of the prongs.

Other objects, advantages, and meritorious features will more fully appear from the specification, claim, and accompanying drawings, wherein:

FIG. 1 is a plan view of a segment of a fastener strip embodying my invention;

FIG. 2 is an end view of a fastener showing the relative elevations and shape thereof prior to being bent for insertion in a panel;

FIG. 3 is a cross sectional view through a panel into which the fastener of FIG. 2 has been pressed;

FIG. 4 is a cross sectional view similar to FIG. 3 but wherein the ends of the prongs have been clinched;

FIG. 5 is a perspective view showing a pair of fasteners mounted on a trim panel adjacent an aperture therethrough;

FIG. 6 is an end view of another fastener embodying my invention; and

FIG. 7 is a cross sectional view through a panel into which has been pressed a fastener formed from the strip of FIG. 1 with the ends of the prongs clinched.

As shown in FIG. 1 the trim fastener strip includes a metal ribbon shaped to provide a succession of similarly shaped fasteners integrally connected together in end-to-end relation. Successive fasteners are indicated at 10, 12 and 14. The strip is particularly suitable for use with a cutoff and fastener applying machine such as that disclosed in our copending application Serial No. 774,405 filed November 11, 1958, now U.S. Patent 3,007,169. The fasteners of the strip are integrally connected by pairs of tabs 16 and 18. These tabs are of a length in one embodiment substantially three times the thickness of the metallic ribbon from which the fasteners are formed. These are longer than the thickness of the metal of the ribbon and shorter than the length of a prong 26 hereinafter mentioned. These tabs are severable. In being severed the tabs are cut through transversely substantially midway of their lengths so that the disconnected fastener is provided with small projections or ears 20 and 22. Because the tabs are of a short length, the resulting projections following severing are not objectionable. By providing pairs of tabs between successive fasteners, the strip is quite resistant to twisting about a longitudinal axis. Also, the pair of tabs serves to support the leading fastener of the strip in a cutoff position with very little other support for the fastener, thereby substantially simplifying the construction of the machine which severs, shapes, and applies the fasteners.

Each fastener is provided with oppositely extending coplanar prongs 24 and 26 integral with the fastener and disposed at opposite side edges thereof. The free pointed ends of the prongs are deflected out of the plane of the prongs either downwardly as shown at 30 in FIG. 2 or upwardly as shown at 30' in FIG. 6. The prongs are bendable adjacent the fastener from a position coplanar with the fastener as shown in FIG. 2 to a position extending substantially perpendicularly out of the plane of the fastener as shown in FIG. 3.

The machine with which the strip is used first bends the prongs on the leading fastener of the strip to a downwardly extending position, then severs the tabs and presses the fastener through the trim panel to which it is intended to be secured, all as more particularly shown in said Patent No. 3,007,169. As the fastener passes through the panel, which panel, which may be fiberboard or the like as indicated at 32, and covered, for example, with fabric or sponge vinyl 34, the prongs tend to follow the deflection of the sharp ends 30 and 30'. As the prongs follow the deflected ends, they bias the fastener in the panel and ensure that the prongs will be clinched in the intended direction when they engage the clinching die, not shown. The fastener shown in FIG. 3, when the prongs thereof engage the clinching die, is shaped to the configuration shown in FIG. 4, wherein it will be noted that the prongs extend in spaced relation below the fastener and substantially parallel therewith tightly compressing the sponge vinyl 34 between the prongs and the backing sheet 32.

Each fastener is provided with a screw thread-receiving portion disposed centrally thereof. Such screw thread-receiving portion may comprise, as shown in FIGS. 1, 2 and 6, a generally conical protuberance 36 having a screw-receiving aperture 38 extending through the apex thereof. One side of the protuberance is severed completely therethrough from the aperture 38 to the base of the protuberance providing a slit 40. The severed edges of the protuberance at the slit 40 are deflected relative to each other so that the edge of the aperture 38 will engage and hold the threads of a screw received through the aperture 38. For example, it will be noted that slit 40 is disposed opposite the prongs 26 so that as a screw in the helix is tightened there will be sufficient metal adjacent the slit to prevent the helix from flattening.

Whether the free ends of prongs 24 and 26 are clinched inwardly as shown in FIG. 4, or outwardly as shown in FIG. 7, will depend in part on the location of the fastener. If the prongs are to be clinched outwardly the free sharp ends will be deflected upwardly as shown in FIG. 6. If the prongs are to be clinched inwardly the sharp free ends are deflected downwardly as shown in FIG. 2. If it is to be secured at the margin of the panel as in FIG. 4, it may be desirable to clinch the prongs inwardly, while if sufficient area is available, the prongs are preferably clinched outwardly.

FIG. 5 shows a typical application of the fasteners adjacent the dome light-receiving aperture 46 in an automotive head lining panel. The light is affixed against the sponge vinyl surface 48 and the screws are extended upwardly through the panel and into the fasteners. It will be noted that the ears 20 and 22 are so short as not to be objectionable.

By having prongs 24 and 26 project outwardly from opposite sides of the strip, the prongs can be guided into guideways which will support the strip in the machine, as disclosed in said Patent No. 3,007,169, prior to being bent out of the plane of the strip.

The fasteners may be disposed over an aperture in a trim panel so that various trim devices which it is desired to secure to the panel may have the screws thereof passed through the panel and through the fastener to hold the trim devices on the panel.

What is claimed is:

A trim fastener strip for use in a fastener bending, cutoff, and applying machine comprising: a succession of rectangularly shaped discrete planar metal fasteners connected end-to-end by a pair of integral severable tabs at each end of each fastener, said fasteners being otherwise disconnected from each other, a pair of prongs integral with and lying substantially in the plane of each fastener with one prong of each pair disposed at and midway of each side edge of the fastener which extends longitudinally of the strip, the outer end of each prong being pointed, each prong being bendable adjacent the fastener from a position substantially coplanar with the fastener to a position extending perpendicularly away from the plane of the fastener, each tab having a length in the direction of the length of the strip greater than the thickness of the ribbon and less than the length of a prong, said tabs being spaced from each other transversely of the strip a distance substantially greater than their length, each prong having a width less than one half the length of the fastener measured along the length of the strip, each fastener shaped to provide a conical protuberance at the center thereof, said protuberance having a screw-receiving aperture through the apex, one side of the protuberance being severed through from said aperture to substantially the base of the protuberance with one severed edge deflected below the other to provide a screw thread engaging edge around the aperture through the apex, said slit disposed at that side of the protuberance facing one of said prongs, the free end of each prong being pointed with the pointed end portion being deflected out of the plane of the prong to cooperate with an anvil to clinch the prong against the opposite face of a panel over which the fastener lies, with the prong bendable intermediate the deflected pointed end and the juncture of the prong with the fastener to facilitate such clinching.

References Cited by the Examiner
UNITED STATES PATENTS

| | | | |
|---|---|---|---|
| 2,315,209 | 3/43 | Kost | 85—17 |
| 2,345,053 | 3/44 | Judd et al. | 151—41.72 |
| 2,494,882 | 1/50 | Kost | 85—36 |
| 2,563,426 | 8/51 | Schafroth | 85—17 |
| 3,007,169 | 11/61 | La Fleur et al. | 1—2 |

EDWARD C. ALLEN, *Primary Examiner.*

CARL W. TOMLIN, *Examiner.*